United States Patent [19]
Bennett

[11] 3,993,344

[45] Nov. 23, 1976

[54] TRANSPORTING SYSTEM

[76] Inventor: Richard C. Bennett, 7333 Armitage Ave., Elmwood Park, Ill. 60635

[22] Filed: Mar. 4, 1975

[21] Appl. No.: 555,160

Related U.S. Application Data

[62] Division of Ser. No. 375,689, July 2, 1973, abandoned.

[52] U.S. Cl. .............................. 296/35 A; 108/51.1; 108/55.1
[51] Int. Cl.² ........................................ B62D 23/00
[58] Field of Search ...................... 214/515; 114/85; 296/28 M, 35 A; 105/366 R, 366 A, 366 B, 366 C, 366 D, 366 E, 463, 464, 465, 370, 371, 375, 422; 108/51, 53, 55, 58

[56] References Cited
UNITED STATES PATENTS

| | | | |
|---|---|---|---|
| 2,685,398 | 8/1954 | King................................ | 214/621 X |
| 2,692,107 | 10/1954 | De Ridder et al. ................... | 108/51 |
| 3,695,471 | 10/1972 | Rivers.................................. | 214/515 |

*Primary Examiner*—Robert G. Sheridan
*Attorney, Agent, or Firm*—Prangley, Dithmar, Vogel, Sandler & Stotland

[57] ABSTRACT

A vehicle has a bed divided into a plurality of bays by means of dividers. Article carriers are constructed to be positioned in the bays by means of a loader-unloader such as a lift truck. The side walls of each article carrier converge downwardly so as to engage the tops of adjacent dividers and guide the article carriers into a chosen bay. The bed may be provided with a longitudinally extending tube which is engaged by the inner end of an article carrier to facilitate its being dropped into position. Each article carrier may be provided with at least one locking mechanism which automatically unlocks when engaged by a loader-unloader, and automatically locks into the bed of a truck when released by the loader-unloader after being positioned in a chosen bay.

8 Claims, 12 Drawing Figures

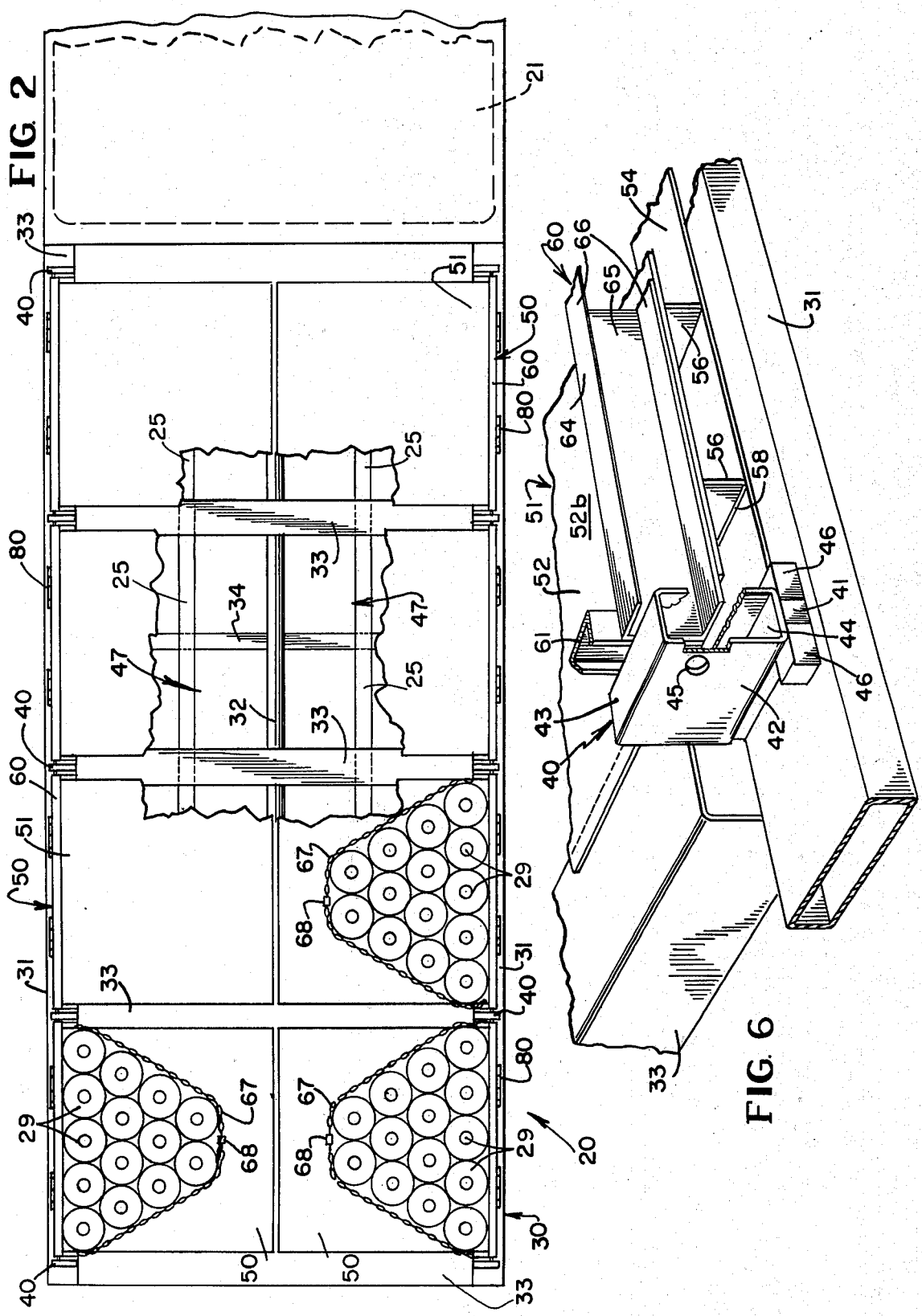

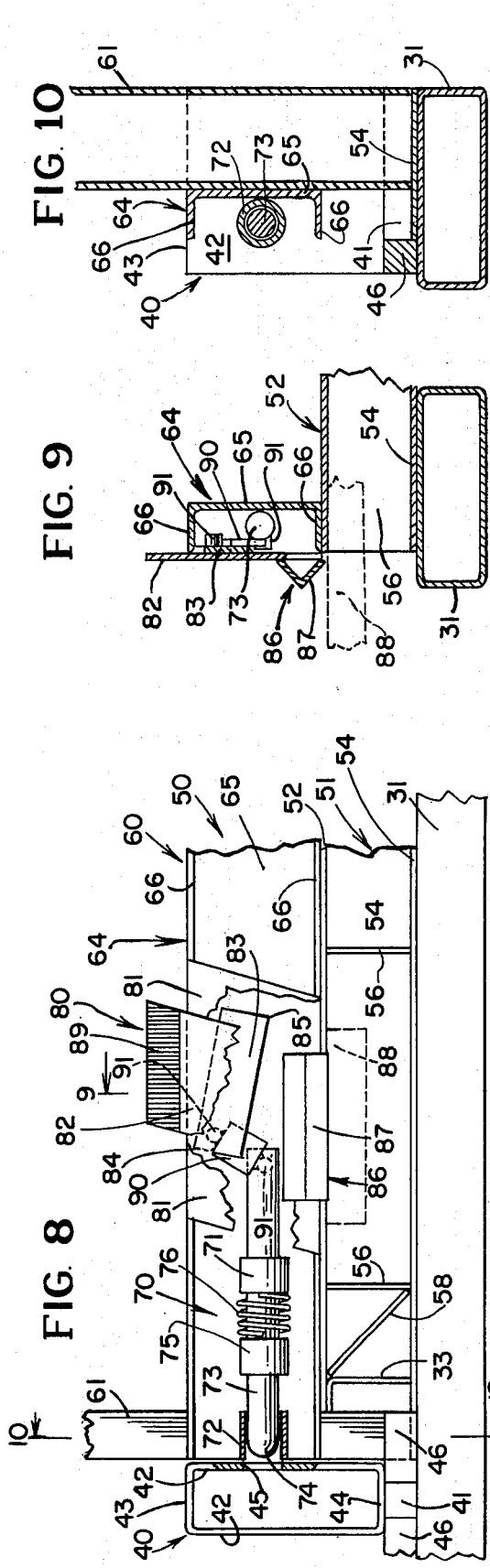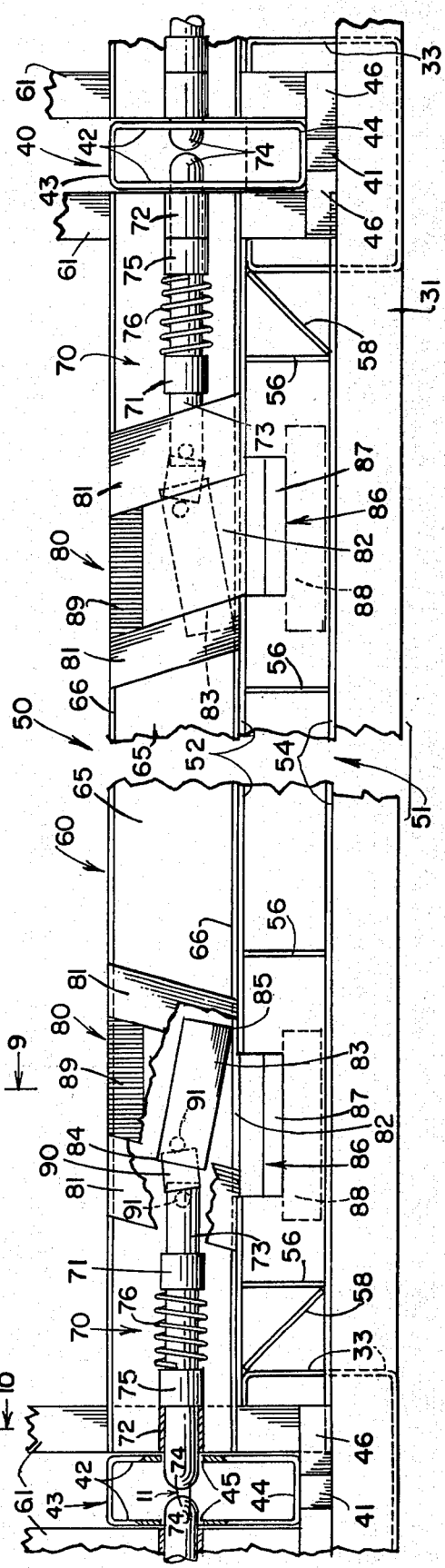

TRANSPORTING SYSTEM

This is a division of application Ser. No. 375,689, filed July 2, 1973, now abandoned.

BACKGROUND OF THE INVENTION

The use of palletized trucking systems is not new. Such a system includes a vehicle having a bed, a number of pallets removably positioned on the bed, and a forklift truck for placing the pallets on the bed and taking them off the bed.

Such a system is used by individually loading pallets with articles such as gas-filled tanks under pressure. A forklift truck is then operated to transport each pallet individually to the vehicle and then load them onto its bed.

It has been found that the employment of such a system has resulted in substantial savings in time and reduced personnel to load and unload. A plurality of tanks can be loaded onto each pallet in the distributor's plant. The vehicle may then be loaded with the pallets very quickly. This is in distinction to the older practice of individually loading tanks onto the truck bed. While the vehicle is then traveling to a customer, additional pallets may be loaded at the distributor's plant for future shipment. A given vehicle can make many more deliveries per day. At the destination, a forklift truck rapidly unloads the loaded pallets from the truck and delivers them into the customer's plant. Full tanks are used by the customer as needed and are replaced on the pallets by empty tanks. Again, the time for unloading is substantially reduced over that required individually to roll off tanks from a truck bed. Also, employed of such a system reduces handling of the tanks.

While this development is not new, presently known systems have not been entirely satisfactory. First, the operator of the forklift truck must become rather skilled in loading the pallets onto the truck. Even with such skill, he must exercise care so as to align the pallet with a chosen bay, and then lower the pallet into such bay. If he is not careful, the pallet will strike the dividers provided between adjacent bays, and he will then have to shift the truck and try again. Such a procedure is both time-consuming and because not designed to strike the dividers, the pallets and the articles carried thereby may become damaged.

Another shortcoming of presently available systems is the requirement that the pallet be substantially norizontal as it is beng lower into a chosen bay. Otherwise, it would be most difficult for the operator to align the pallet vertically. In other words, the operator must align all four corners of the pallet respectively with the four corners of the bay.

Since the pallets are carried by a moving vehicle, they are subject to being jostled during transportation to the destination. The pallets of certain systems are not sufficiently secured in place while the truck is in motion to prevent them from being dislodged as the result of a sharp turn. Should a pallet fall off the truck, both the pallet and the articles carried thereon will be subjected to damage and, of course, serious injury to a passer-by or damage to another vehicle could result.

Sometimes a latching means has been provided to protect against unintentional dislodgment. However, these mechanisms are manually actuated, so that a forgetful operator or a lazy operator may simply not latch the latching mechanism.

The vehicles of presently known systems often have a solid bed so as to collect snow and, add additional weight to the vehicle. Also, such beds undesirably furnish but a single level of support for the pallets.

SUMMARY OF THE INVENTION

It is, therefore, an important object of the present invention to provide a transporting system comprising a vehicle bed and article carriers which may be rapidly loaded thereon with a minimum of care exercised by the operator.

Another object is to provide a transporting system in which the opportunity for damage to either the pallets or the vehicle bed during loading on the bed is minimized.

Still another object is to enable the operator of a loader-unloader to load pallets onto a vehicle bed by first aligning the inner end of the pallet with predetermined structure on the bed, and then lowering the pallet.

Yet another object is to enable the operator of a loader-unloader to approach the vehicle bed with a pallet disposed at an acute angle with respect thereto.

A further object is to provide a transporting system including a vehicle bed and a plurality of article carriers removably disposed thereon and latched thereto by means of latching mechanisms which are automatically unlatched when carried by the loader-unloader.

A still further object is to insure that the pallets are automatically locked onto the vehicle bed without the operator having to perform any positive step other than simply positioning the article carrier on the bed.

Still another object is securely to latch pallets in place on a vehicle bed.

A further object is to provide a strong, light weight pallet.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its mode of construction, assembly and its operation, and many of its advantages should be readily understood and appreciated.

FIG. 2 is a top plan view of the transporting system of FIG. 1 with portions of some of the pallets being cut away to expose the underlying frame of the bed;

FIG. 6 is a perspective view of a fragmentary portion of a pallet and a fragmentary portion of the vehicle bed, with the latching mechanism deleted;

FIG. 7 is an enlarged front elevational view of the lower portion of the pallet and the manner in which it is seated on the vehicle bed, the latching mechanisms being shown in the latching conditions thereof;

FIG. 8 is a view similar to FIG. 7 illustrating the left-hand side latching mechanism in the unlatching condition thereof;

FIG. 9 is a view in vertical section taken along the line 9—9 of FIG. 8;

FIG. 10 is a view in vertical section taken along the line 10—10 of FIG. 8;

BRIEF DESCRIPTION OF THE PREFERRED EMBODIMENT

Figure 1:
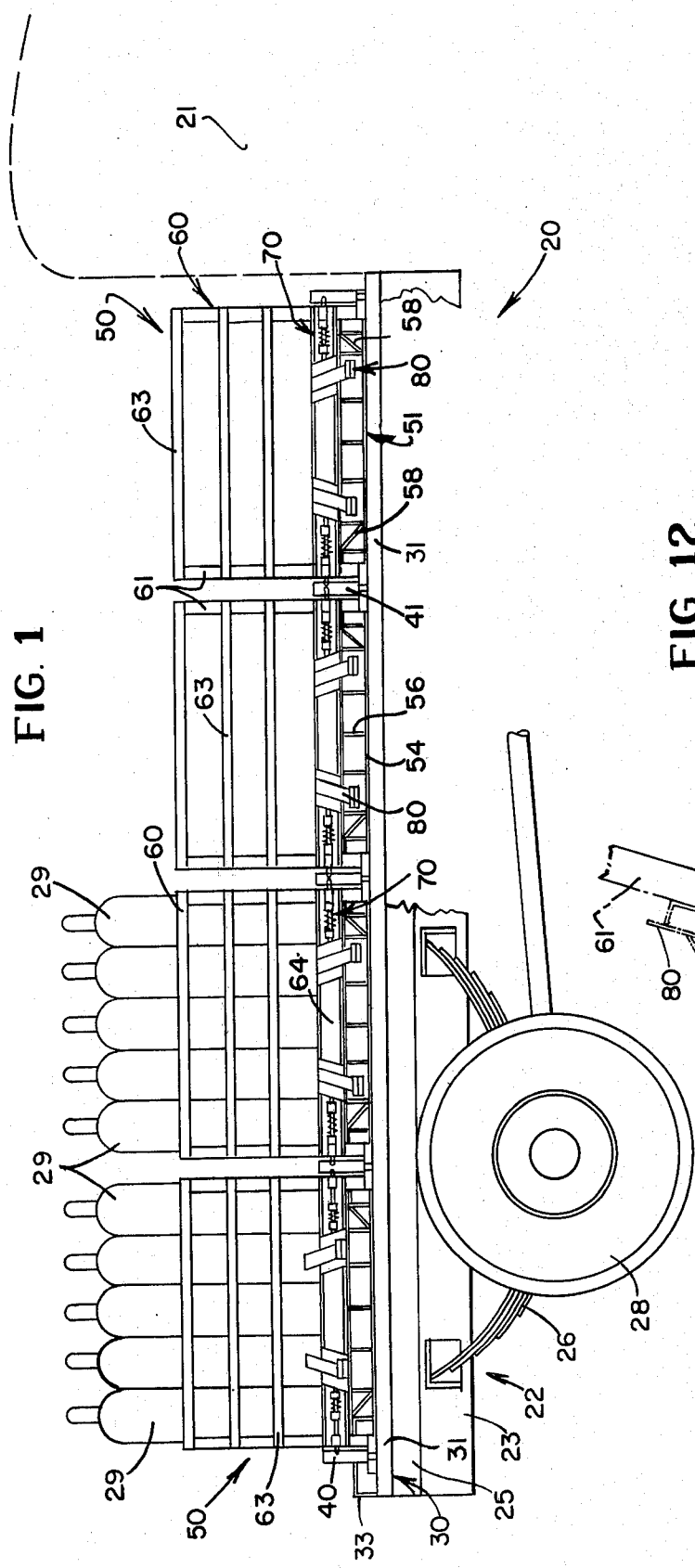
FIG. 1 illustrates a transporting system incorporating the features of the present invention, which comprises a vehicle bed, and a plurality of pallets, the trailer for the bed and the vehicle cab being shown in fragmentary form.

Turning now to the drawings, there is illustrated a transporting system comprising a vehicle 20, which vehicle includes a cab 21 and a trailer 22. The trailer 22 is of basically standard construction and has a pair of longitudinally extending main beams 23, spaced by crossbeams 24. Two spacer beams 25 are respectively carried by the main beams 23. Springs 26 carry an axel 27, on which are mounted the wheels 28. The vehicle 20 includes a load-supporting bed 30 made up of a pair of longitudinally extending side beams 31 and a longitudinally extending center beam 32 which is substantially cylindrical in lateral cross section. Each side beam 31 has a load-supporting upper surface 31a. The bed 30 also includes five laterally extending crossbeams 33 and four laterally extending crossbeams 34, only one of which is shown in FIG. 2. The crossbeams 33 are equidistantly spaced apart, and one crossbeam 34 is arranged centrally between two adjacent crossbeams 33. In the embodiment shown, each crossbeam 34 is substantially narrower than each crossbeam 33. The crossbeam 33 respectively have load-supporting upper surfaces 33a which are substantially coplanar at a first level. The top of the cylindrical surface of the center beam 32 substantially lies in the plane defined by the load-supporting surfaces 33a. The upper surfaces 34a of the crossbeams 34 are also coplanar, but are at a second level below the level of the surfaces 33a, for reasons to be explained hereinafter. The upper surfaces 34a of the crossbeams 34 are substantially coplanar with the surfaces 31a of the side beams 31.

In one form of the invention which was constructed, each of the side beams 31 had a transverse cross section of 2 inches × 6 inches, the center beam 32 had a diameter of 2¼ inches, each of the crossbeams 33 had transverse dimensions of 5 inches × 7 inches, and each of the crossbeams 34 had transverse dimensions of 2 inches each of the crossbeams 34 had transverse dimensions of 2 inches × 3 inches.

On each end of each crossbeam 33 is a divider 40 supported by a base 41, as is best seen in FIG. 6. Each divider 40 is very short compared to the width of the bed 30. The divider 40 includes a pair of spaced-apart, substantially parallel side walls 42, a top wall 43, and a bottom wall 44. In each side wall 42 there is provided a keeper 45 which, in the form illustrated, is simply a hole. The keeper 45 is near the outer end of each of the side walls 42 and closer to the top wall 43 than the bottom wall 44. At the forward end of the base 41 is a pair of oppositely directed abutments 46 extending parallel to the longitudinal axis of the vehicle 20. The dividers 40 divide the bed 30 into a plurality of eight bays 47 arranged in two columns. Each bay 47 is rectangular in outline and in the embodiment shown is essentially square in outline. Each bay 47 is defined approximately by adjacent dividers 40, associated abutments 46, and the center line of the center beam 32.

Figure 12:
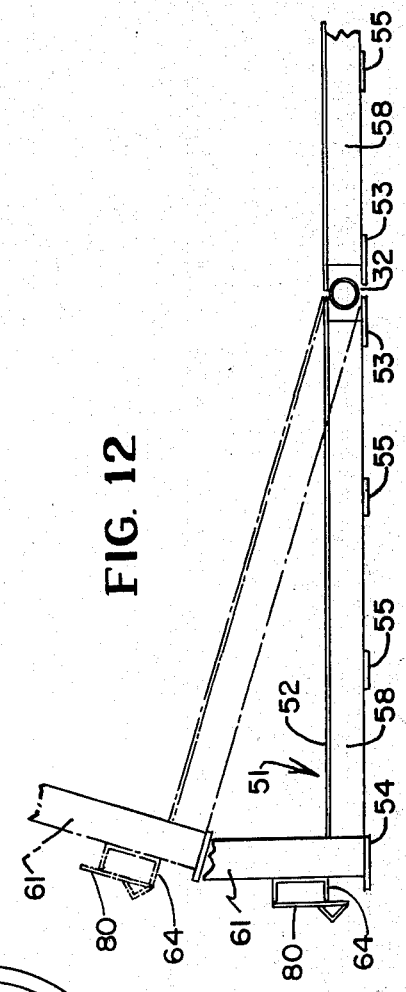
FIG. 12 is a partly schematic view of a pallet and the manner in which it is positioned on the vehicle bed.
Figures 4, 5:
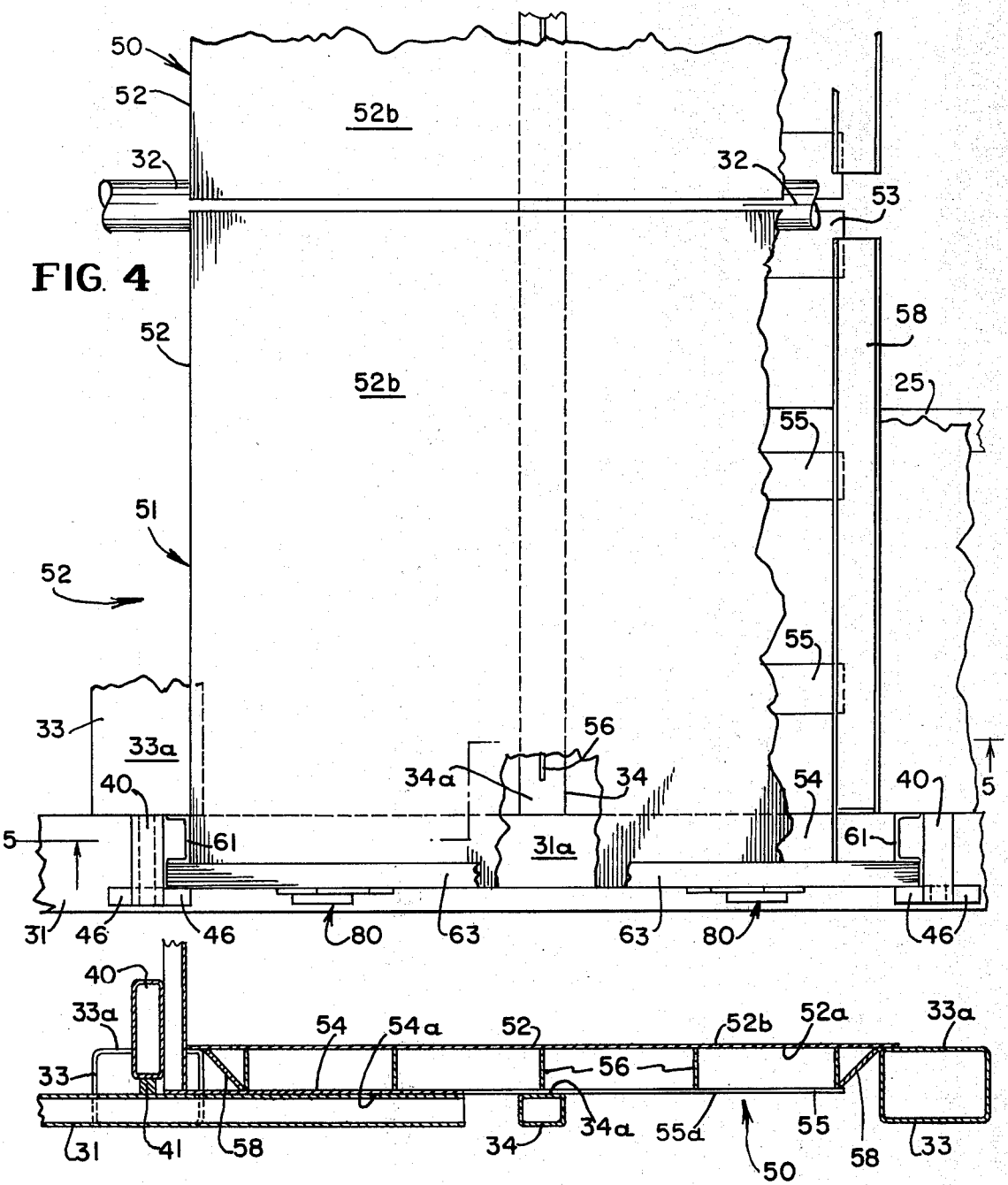
FIG. 4 is a top plan view, on an enlarged scale of two laterally adjacent pallets on the vehicle, with a portion of each of the pallets'top plates being cut away to expose the struts and slats of the pallets, and another portion of a pallet being cut away to expose one of the beams forming the bed.
FIG. 5 is a view in vertical cross section taken along the line 5—5 of FIG. 4.

The transporting system further comprises a plurality of rectangular pallets 50 corresponding in number to the number of bays 47, in the example illustrated, eight. Referring to FIGS. 4 and 5, each pallet 50 includes a platform 51 having an inner end to be disposed toward the center beam 32, and an outer end to be disposed toward a side beam 31. The platform 51 has an upper plate 52 with a lower surface which defines a bearing surface 52a, and with an upper surface which defines an article-supporting surface 52b on which articles such as the tanks 26 are disposed. Each platform 51 includes an inner slat 53, an outer slat 54, and two slats 55 between the slats 53 and 54. The slats 53, 54 and 55 are equidistantly spaced and extend laterally with respect to the direction of the platform 51. The slats 55 are slightly narrower than the slats 53 and 54. Five equidistantly spaced struts 56 extend longitudinally with respect to the direction of the platform 51 and are welded to the slats 53, 54 and 55 and to the plate 52. The outer edge of the slat 54 is substantially coplanar with the outer edge of the plate 52, the outer ends of the struts 56 being substantially coplanar with the outer side of the slat 54. Also, there is provided a laterally extending strut 56 adjacent the inner end of the platform 51 which strut 56 is perpendicular to the plate 52 and to the inner slat 53. As is best seen in FIG. 12, the inner end of the plate 52 and the inner end of the inner slat 53 are substantially coplanar. The slats 53 and 55 are substantially the same length and are offset inwardly with respect to the sides of the plate 52. Two side walls 58 are welded to the slats 53, 54, and 55 and to the plate 52, and converge downwardly, that is, away from the article-supporting surface 52b. The outer slat 54 is offset outwardly with respect to the sides of the plate 52 as is seen in FIG. 5. The pallets 50 are lightweight, yet strong, by virtue of the construction described. A rather thin, sheet metal plate of, for example 3/16 inch can be employed without sacrificing strength. It should be noted that in the preferred form illustrated, all of the elements of the pallet 50 are welded together.

Figure 11:
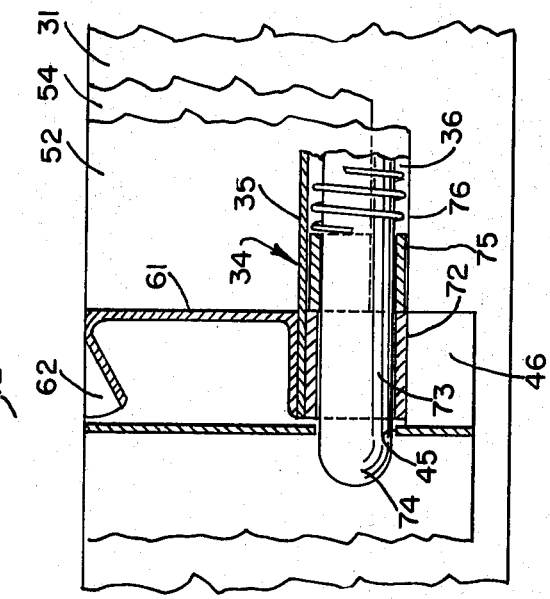
FIG. 11 is an enlarged view in horizontal section taken along the line 11—11 of FIG. 7.
Figure 3:
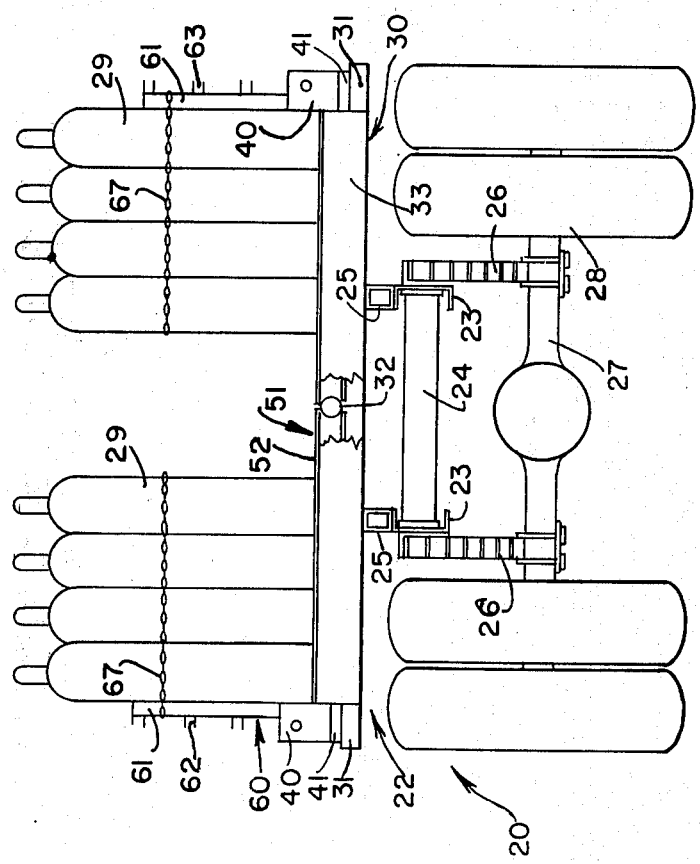
FIG. 3 is a rear elevational view of the transporting system of FIG. 1.

Each pallet 50 also includes a fence 60 mounted at the outer end of the platform 51. The fence 60 has two posts 61 which are outwardly facing channels and rest respectively on the end portions of the outer slat 54 to which they are welded. The posts 61 are also welded to the sides of the top plate 52. Referring to FIG. 11, a guide surface 62 is formed on the inner flange of each post 61. The guide surfaces 62 of the post 61 converge toward the inner end of the platform 51.

The fence 60 also includes three parallel cross members 63 and a fourth cross member 64 welded to the posts 61 and substantially equidistantly spaced. The cross member 64 is the lowermost, and includes a web 65 and flanges 66. The cross member 64 rests on the outer end of the top plate 52 and may be welded thereto. A chain may be secured to the fence 60 near the top thereof, which chain 67 is used to hole the tanks 29 in place. The chain 67 is provided with the usual tightening mechanism 68 to insure that the tanks 26 are bound tightly against the fence 60.

Turning now to FIGS. 4 and 5, the manner in which the pallets 50 seat in the bays 47 will be described. As previously explained, the underside of the plate 52, around the periphery thereof, defines a bearing surface 52a. The bearing surface 52a, in the region of the inner end of the pallet 50, rests on the center beam 32 (see also FIG. 12). The bearing surface 52a, in the region of the sides of the pallet 50, rests on the load-supporting surfaces 33a of the crossbeams 33. The undersides of the slats 53, 54, and 55 respectively define bearing surfaces (the bearing surfaces 54a and 55a are shown in FIG. 5), the center regions of such bearing surfaces resting on the load-supporting surface 34a of the crossbeam 34. Also, the underside of the slat 54 defines a bearing surface 54a which rests on the load-supporting surface 31a of the side beam 31. Thus, the pallet 50 is supported by the bed 30 at two levels. The first level is defined by the load-supporting surfaces 33a and the corresponding portion of the surface of the center beam 32. The second level is defined by the surfaces 31a and 34a. The distance between these two levels is substantially equal to the distance between the plane defined by the bearing surface 52a and the plane defined by the bearing surfaces 53a, 54a, and 55a.

Each pallet 50 is arranged in its associated bay 47 in a similar fashion and is also supported at dual levels, thereby giving rise to a highly reliable and structurally sound system.

As is best seen in FIG. 2, the eight pallets 50 arranged on the bed 30 define substantially the entire floor for the vehicle upon which one may walk and upon which the tanks 29 may be disposed. In the embodiment illustrated there is only a very slight space, preferably less than an inch between laterally adjacent pallets 50 and no more than six inches between longitudinally adjacent pallets 50. If desired, a strip may be provided in each such space. In the embodiment illustrated, a distance of five inches separate longitudinally adjacent pallets 50. However, by suitable cutouts in the top plate 52 and/or other modifications, that distance could be reduced substantially. The open frame construction of the bed 30 and the use of pallets 50 to define substantially the entire floor of the bed is desirable, first, because it reduces the weight of the bed 30 and thereby renders it less expensive. Also, less snow an collect on the bed 30 when it is not loaded with pallets 50. Moreover, the pallets 50 can be larger since no fixed portion of the bed 30 is devoted to aisles. Further contributing to the reduced weight of the bed 30, yet high strength thereof, is the hollow, box-like construction of the beams 31, 33 and 34 and the hollow tube construction of the center beam 32. To prevent corrosion, these beams may be coated on their interior by a suitable oil.

Located in the channel defined by the cross member 64, at each end thereof, is a latching mechanism 70 (see FIG. 7 specifically). The latching mechanism 70 includes a pair of longitudinally spaced-apart bushings 71 and 72 welded to the web 65 of the cross member 64. Reciprocally carried by the bushings 71 and 72 is a bolt 73 having an outer end 74 which is rounded as shown. The bolt 73 is movable between a latching condition, illustrated in FIG. 7, and an unlatching condition when it is retracted as shown in FIG. 8. A sleeve 75 is fixedly mounted on the bolt 73 near the end 74 of the bolt 73. A spring 76 in compression is carried by the bolt 73 between the bushing 71 and the sleeve 75, thereby urging the bolt 73 outwardly to its latching condition.

There is also provided an actuator 80 associated with each of the latching mechanisms 70, the actuator 80 including a pair of spaced-apart rails 81 arranged at an incline, so that the guideway defined by the rails 81 is also inclined. A carriage plate 82 has a thickness approximately the thickness of the rails 81. The plate 82 has a width slightly less than the distance between the rails 81 and is slidably disposed therebetween. A strip 83 is welded to the inner surface of the carriage plate 82 and has a length so as to protrude outwardly from the sides thereof. The uppermost corner 84 of the strip 83 defines a shoulder which is capable of abutting against the upper flange 66 of the cross member 63. The lowermost corner 85 of the strip 83 also defines a shoulder which is adapted to abut against the lower flange 66 of the cross member 63. Thus, the corners 84 and 85 limit movement of the carriage plate 82. Welded to the lower end of the carriage plate 82 is a diverter 86 which is an elongated member being V-shaped in transverse cross section. The lower surface 87 of the diverter 86 constitutes a diverting surface to guide the fork 88 of a lift truck to a position beneath the carriage plate 82. The outer surface of the carriage plate 82 in the upper region therof may have warning indicia 89 which may take the form of a red paint, for example. Such indicia apprise the operator of the condition of the latching mechanism 70, as will be described.

There is also provided a link 90 which, in the embodiment being described, takes the form of a substantially rectangular plate having welded to opposite sides thereof a pair of depending pins 91. One of the pins 91 is rotatably received in a hole in the inner end of the bolt 73, and the other of the pins 91 is rotatably received in a hole in the strip 83 adjacent to the corner 84 thereof. The outer ends of the pins 91 may be peened to provide a permanent connection.

Turning now specifically to FIG. 7, the manner of operation of each latching mechanism 70 will be described. The bolt 73 is illustrated as being in a latching condition, that is, the end 74 protrudes outwardly and through the keeper 45 in one side wall 42 of the adjacent divider 40. The action of the spring 76 urges the sleeve 75 outwardly with respect to the bushing 71, thereby biasing such bolt 73 to such latching condition. The engagement of the shoulder defined by the corner 85 of the strip 83 with the lower flange 66 limits the outward movement of the bolt 73. The latching mechanism 70 on the right-hand side of the pallet 50 illustrated in FIG. 7 is similarly in its latching condition.

The spacing between adjacent struts 56 of a pallet 50 is substantially greater than the width of the fork 88 of a lift truck, and also the two diverters 86 of a pallet 50 are respectively spaced apart a distance corresponding to the usual distance between a pair of forks on a lift truck. Accordingly, a lift truck 20 may approach the pallet 50 and insert its forks 88 into the space between adjacent pairs of struts 56 as illustrated. After the operator aligns the forks 88 with the space between the bottom of the diverter 86 and the slats 53–55, he drives forwardly and then causes the forks 88 to be raised. If he strikes the diverting surface 87 of the diverter 86, the forks 88 will be guided to a position beneath the diverter 86, as illustrated in FIG. 9, and/or the diverter 86 will be raised to accomodate the insertion of the forks 88. The distance between adjacent struts 56 is selected to insure that as long as the operator aligns his forks 88 therebetween, they will be in position to engage a substantial portion of the diverter 86, and he need not back up to align the forks 88 more nearly in the middle of adjacent struts 56. Thus, it can be seen that the distance between adjacent struts 56 and the use of the diverter 86 facilitates placement of the forks 88 in position with a minimum amount of effort and time expended by the operator. Also noteworthy is the fact that the forks 88 need not enter straight — they can enter at an angle with respect to the horizontal or the vertical. Once the forks 88 are in the position illustrated in FIG. 7, the latching mechanism 70 may be unlatched.

Turning now to FIG. 8, the details as to the manner in which each latching mechanism 70 is unlatched will be explained. The operator causes the forks 88 to be raised, thereby causing the carriage plate 82 to move upwardly and toward the right (the left-hand mechanism moves to the left) in accordance with the guideway of the rails 81. Such upward motion is limited by virtue of the corner 84 engaging the upper flange 66 of the cross member 63. The link 90 is thus caused to rotate counterclockwise, as illustrated in FIG. 8, to retract the bolt 73 along the bushings 71 and 72. This action is performed against the biasing furnished by the spring 76. The bolt 73 is, therefore, placed in its unlatching condition, that is, it is withdrawn from the keeper 45 in the divider 40. The outer fork 88 of the lift truck will perform in a substantially identical fashion in respect to the latching mechanism on the other side of the pallet 50. The pallet 50 may then be taken off of the bed 30 and transported by the lift truck to its intended destination. It is to be understood, however, that the above-described unlatching procedure can be performed in one fluid motion, that is, the operator is able to insert the forks 88 of his lift truck readily as previously explained, whereupon he causes the forks 88 to be raised, causing the latching mechanisms 70 to become unlatched, whereupon the forks 88 are free to raise the pallets 50. It should be appreciated that the unlatching procedure is completely automatic. The forklift truck operator need only cause insertion of the forks 88 of his left truck into appropriate spaces in the pallet 50 and then cause the forks 88 to be raised in the usual way. The latching mechanism 70 are automatically unlocked with no further steps required of the operator.

In loading a pallet 50 onto the bed 30 of the vehicle 20, the lift truck approaches the pallet 50 so that its forks 88 are aligned with the appropriate spaces between adjacent struts 56. The forks 88 are then caused to be inserted, which is accomplished readily and rapidly in accordance with the previous description on this point. The operator causes the forks 88 to raise in preparation for transporting the pallet 50 to the vehicle bed 30. Again, as previously described, the simple elevation of the forks 88 causes both latching mechanisms 70 automatically to unlock without any further actions required of the operator. The operator then drives the lift truck to the vehicle 20 to place it on the bed 30 thereof.

Referring to FIG. 12, a preferred procedure of loading the pallet 50 will now be described. The operator chooses a bay 47 in which to deposit the pallet 50 and then roughly aligns the pallet 50 horizontally. The operator then causes the mast of the lift truck to tilt forwardly, thereby placing the pallet 50 at an acute angle with respect to the vehicle bed 30. The truck then moves forwardly until the inner end of the plate 52 rests on the center beam 32. Such forward motion is limited by virtue of the inner ends of the struts 57 and the side walls 58 engaging the side of the center beam 32. Then, the forks 88 are caused to be lowered until the pallet 50 rests on the bed 30.

When the pallet 50 is delivered into the selected bay 47 at such acute angle, the leading element is the inner slat 53. The length of that slat is substantially less than the distance between the cross beams 33. For example, the length of the slat 53 may be about 41 inches and the distance between the beams 33, 46 inches, thus allowing a tolerance of about 5 inches. If the operator is misaligned to the left, for example, by as much as 5 inches in the example illustrated, the side wall 58 on the left side of the pallet 50 will engage the beam 33 which because of the inclination of such side wall, will guide the pallet 50 downwardly and to the right as the pallet 50 is lowered by the lift truck, until the innermost end of the plate 50 may be rotated as previously described in respect to FIG. 12 to seat the pallet 50, in its bay 47. As the pallet 50 is being lowered the side wall 58 may continue to engage the left-hand beam 33. The portion of the left side wall 58 near the outer end of the pallet 50 may engage the left hand divider 40, and thereby guide the pallet 50 more to the right and seat it in the position illustrated. Of course, if the pallet 50 is misaligned to the right, a corresponding series of events will take place to move the pallet 50 to the left by virtue of the engagement by the right-hand side wall 58 with the adjustment beam 33 and the adjacent right-hand divider 40.

It should be noted that the width of the pallet 50 in the region of the leading end, that is, the slat 53, is substantially narrower than the width of the pallet 50 in the region of the trailing end, that is, the length of the fence 60. As an example, the leading end defined by the slat 53 may be 41 inches in length and the width of the trailing end may be 50 inches in length or about 4½ inches wider on each side.

Thus, the operator of the lift truck needs to be moderately careful in aligning the pallet 50 in the chosen bay, since alignment of the pallet 50 in the chosen bay 47 is substantially automatic.

Because the forks 88 hold the latching mechanism 70 in their unlatched condition, the pallet may then be finally dropped into place. When the outer slat 54 is resting on the side beam 31, the operator causes the forks 88 to be withdrawn, whereupon the biasing furnished by the springs 76 urge te bolts 73 outwardly and into the aligned keepers 45, thereby latching the latching mechanisms 70 and securing the pallet 50 in place. The motion of the bolt 73 is transmitted by the respective links 90 to the actuators 80, so that they are returned to the positions illustrated in FIG. 7. The forks 88 are thereafter withdrawn, after the pallets 50 have been locked into place until they are later removed as previously described. It should be appreciated that the latching procedure is completely automatic. The forklift truck operator need only cause withdrawal of the forks 88 of the lift truck out of the pallet 50. The latching mechanisms 70 are automatically locked with no further steps required of the operator.

As is best seen in FIG. 10, the bottom end of the posts 61 and the outer slat 54 secured thereto are disposed inwardly of the abutment 46. Accordingly, the abutment 46 serves as an additional stop to preclude movement of the pallet outwardly even if the latching mechanism 70 should fail to latch. In this regard, the warning indicia 89 at the top of each carriage plate 82 is very apparent if the latching mechanism 70 is not latched. If the operator, upon making a cursory examination, sees any of the warning indicia 89 protruding, he will realize that the associated latching mechanism 70 is unlatched and he can correct the problem.

Referring to FIG. 11, the pallet 50 may be loaded into the chosen bay 47 by approaching it at a much smaller angle. The lift truck moves forwardly to carry the pallet 50 toward the center beam 32. If the pallet 50 were misaligned to the left, the guide surface 62 on the left-hand post 61 would strike the outer end of a divider 40 which would shift the pallet 50 to the right and thereby align the pallet 50. Alternatively, if the pallet 50 were misaligned to the right, the guide surface 62 on the right-hand post 61 would strike the adjacent divider 40 and shift the pallet 50 to the left, thereby aligning the same. The pallet can then be pushed rearwardly by the lift truck until the inner end of the plate 52 rests on the center beam 32, whereupon the front of the pallet 50 can be lowered and seated on the bed 30, all as previously described. Although, preferred methods of loading the vehicle 20 have been described it is to be understood that other methods can be employed.

While the above description refers to pallets consisting of a platform and a fence, it is to be understood that various other kinds of article carriers may be employed. For example, a simple pallet with no fence may be utilized in a particular environment. Also, the article carriers may be containers which have a base incorporating the features of the present invention. The loader-unloader may be something other than a lift truck; for example it could be a crane having suitable structure to perform in accordance with the features of the present invention. Of course, the description of tanks with pressurized gas is merely exemplary articles of almost any type can be transported. Also, the locking structure is merely an example of a variety of mechanisms which could be employed and still incorporate the feature of automatic operation. The beams 31, 32, 33, and 34 need not have a hollow box-like shape; for example, they could be extrusions.

The vehicle 20 may be provided with a deck at its rear end that can be raised and lowered. Such a deck would be used to remove fewer tanks than are carried by a single pallet. For example, one customer may require one or two or three tanks in which case it is more practical to loosen the chain 67 and remove the requisite number of tanks, roll them onto the deck, lower the deck, and roll the tanks to their destination.

The fact that the pallets 50 themselves create the floor for the vehicle 20 is particularly important in this regard where the tanks must be rolled on such floor. Because the plates 52 are relatively thin, for example, 3/16 inches, the space between longitudinally adjacent pallets 50 is not critical.

It is believed that the invention, its mode of construction and assembly, and many of its advantages should be readily understood from the foregoing without further description, and it should also be manifest that, while the preferred embodiment of the invention has been shown and described for illustrative purposes, structural details, are, nevertheless, capable of wide variation within the purview of the invention as described in the appended claims.

What is claimed is:

1. A transporting system comprising a load-supporting bed forming part of a vehicle, said bed being of open construction and including a longitudinally extending cylindrical center beam and two longitudinally extending side beams and a plurality of laterally extending crossbeams, a plurality of pallets arranged to be carried by a loader-unloader respectively onto and off of said bed, each of said pallets including an inner end supported in use by said center beam and an outer end supported in use by one of said side beams, each of said pallets including an article-supporting plate, a pallet being loaded onto said bed by approaching said beam at an acute angle with respect to said bed and resting the associated plate on said center beam and then rotating said pallet until said outer end rests on said one side beam.

2. The transporting system set forth in claim 1, and further comprising a plurality of longitudinally spaced-apart abutments on each of said side beams for retarding outward movement of said pallets.

3. The transporting system set forth in claim 2, wherein each of said pallets further includes a shoulder depending from said article-supporting plate adjacent to said inner end, said shoulder being disposed adjacent to said center beam when said pallet is on said bed.

4. The transporting system set forth in claim 2, wherein said pallet further includes a slat at said inner end and disposed parallel to said article-supporting plate and spaced therefrom a distance greater than the diameter of said center beam, whereby said center beam is received between the article-supporting plate and said slat as said pallet is being loaded onto said bed.

5. A transporting system comprising a load-supporting bed forming part of a vehicle, a plurality of longitudinally spaced-apart and laterally extending dividers which divide said bed into a plurality of bays arranged in two longitudinally extending rows, and a corresponding plurality of article carriers arranged to be carried by a loader-unloader respectively into and out of said bays, each of said article carriers including an article supporting surface and a pair of side walls converging away from said article supporting surface, said side walls being arranged to engage the tops of adjacent dividers and guide said article carriers into the bay between said adjacent dividers, each of said article carriers having an inner end disposed near the longitudinally extending center line of said bed and an outer end disposed near the side of said bed, the width of said article carrier at the inner end thereof being narrower than the width of said article carrier at the outer end thereof, thereby facilitating the movement of an article carrier into a chosen bay.

6. A transporting system comprising a load-supporting bed forming part of a vehicle, a plurality of longitudinally spaced-apart and laterally extending dividers which divide said bed into a plurality of bays, and a corresponding plurality of pallets arranged to be carried by a loader-unloader respectively into and out of said bays, each of said pallets including an article supporting surface and a pair of side walls converging away from said article supporting surface, said side walls being arranged to engage the tops of adjacent dividers and guide said pallets into the bay between said adjacent dividers, each of said pallets having a generally rectangular platform and a fence thereon along one end thereof, each fence including a pair of posts on said platform and extending upwardly therefrom, said posts respectively having inner surfaces thereon converging toward the other end of said platform, said inner surfaces being arranged to engage the outer ends of said dividers and guide said pallets into a chosen bay.

7. A transporting system comprising a load-supporting bed forming part of a vehicle, a plurality of longitudinally spaced-apart and laterally extending dividers which divide said bed into a plurality of bays, and a corresponding plurality of article carriers arranged to be carried by a loader-unloader respectively into and out of said bays, each of said article carriers including first means defining an article supporting surface and second means defining a bearing surface and third means interconnecting said first and second means, each of said article carriers further including a pair of substantially uninterrupted side walls converging away from said article supporting surface, said side walls being arranged to engage the tops of adjacent dividers and guide said article carriers into the bay between said adjacent dividers.

8. The transportig system of claim 7, wherein said first means is a substantially rectangular plate and said second means is a plurality of substantially coplanar slats arranged substantially parallel to said plate, and said third means is a plurality of struts between said plate and said slats and respectively welded thereto.

* * * * *